Dec. 6, 1960  H. J. SHAFER  2,963,262
VENTED RESILIENT RING SEALING CONSTRUCTION
Filed May 27, 1957  2 Sheets-Sheet 1
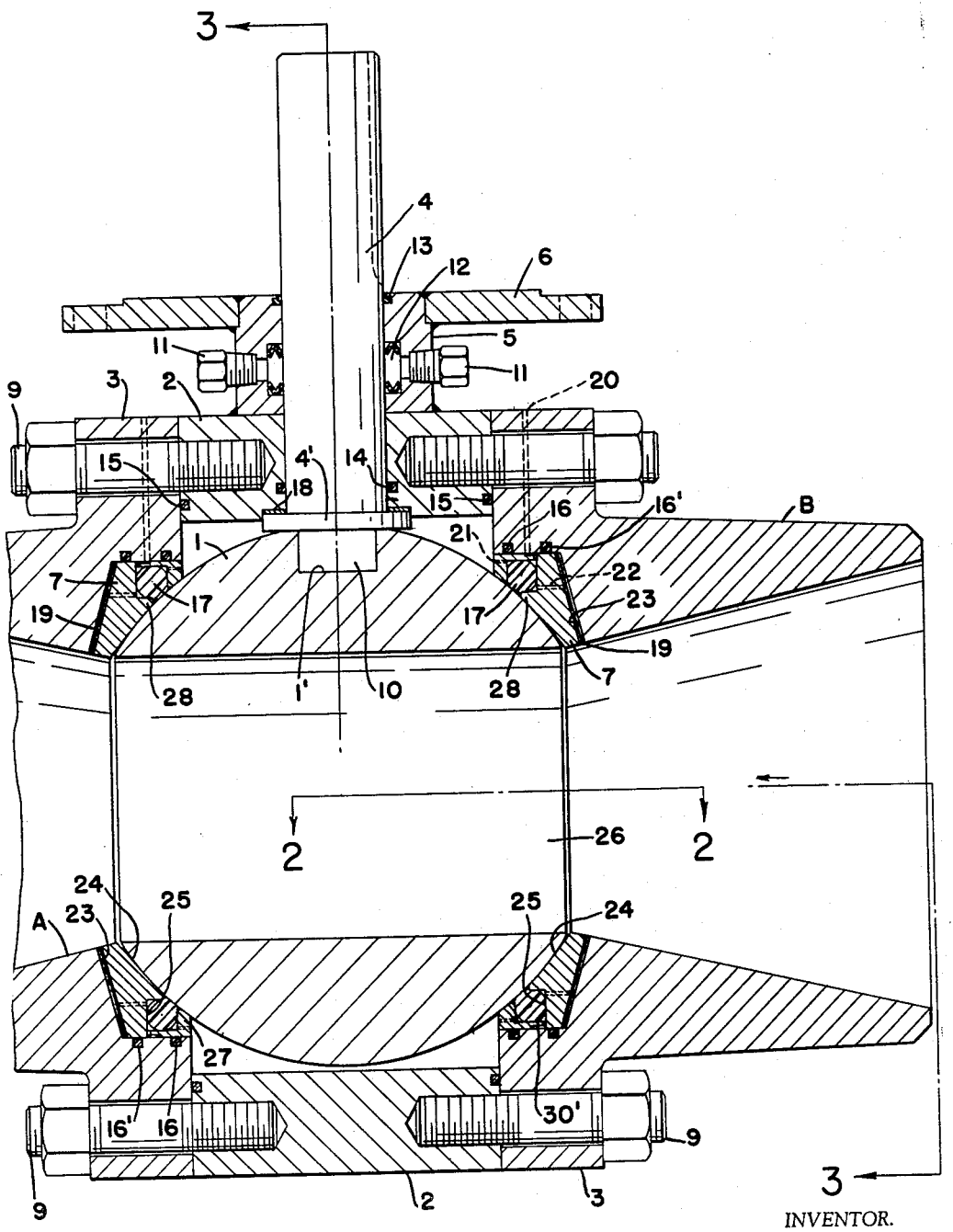
FIG. I
INVENTOR.
HOMER J. SHAFER
BY
ATTORNEY Dec. 6, 1960 H. J. SHAFER 2,963,262
VENTED RESILIENT RING SEALING CONSTRUCTION
Filed May 27, 1957 2 Sheets-Sheet 2
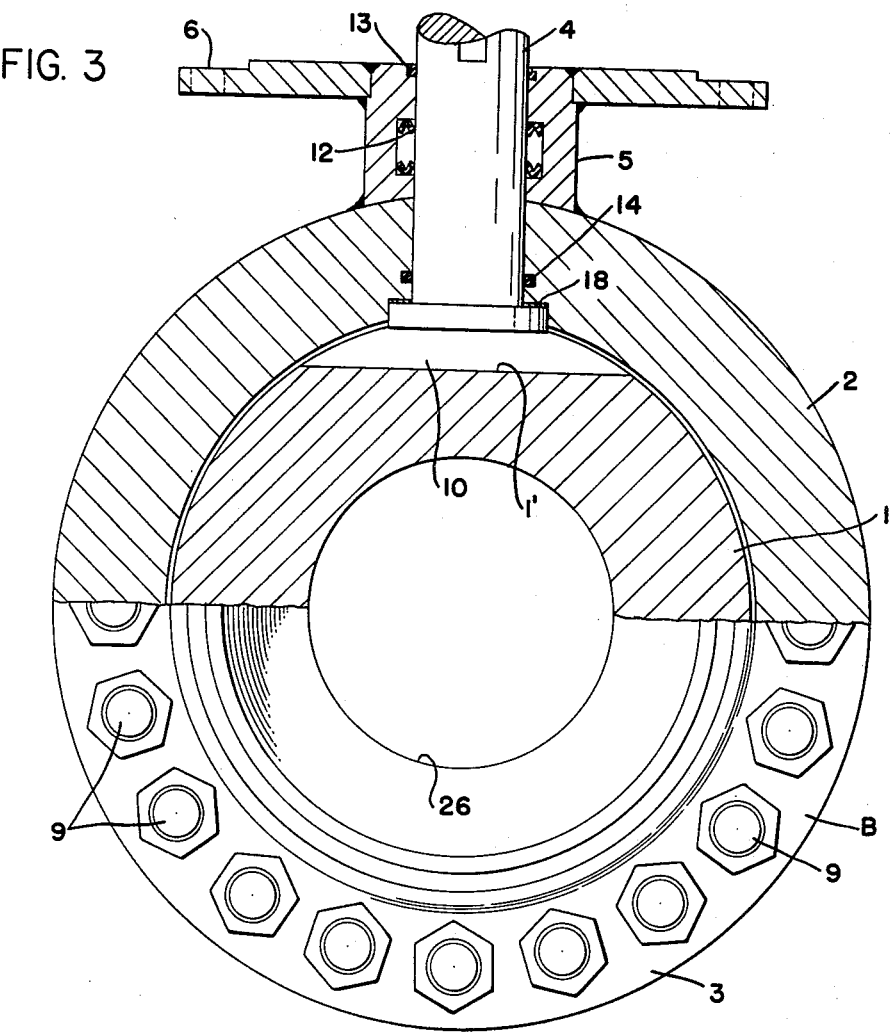
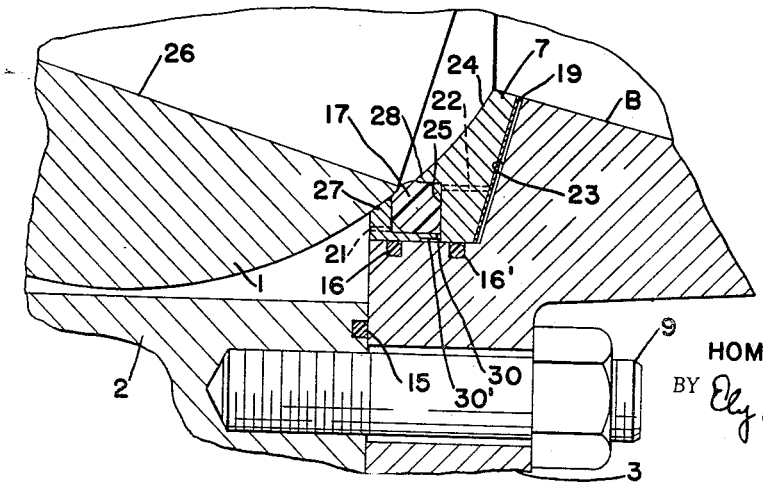
INVENTOR.
HOMER J. SHAFER
BY *Ely, Frye & Hamilton*
ATTORNEY

United States Patent Office 2,963,262
Patented Dec. 6, 1960

2,963,262

VENTED RESILIENT RING SEALING CONSTRUCTION

Homer J. Shafer, P.O. Box 83, Mansfield, Ohio

Filed May 27, 1957, Ser. No. 661,905

9 Claims. (Cl. 251—172)

The invention relates generally to sealing means for valves operating at various pressures, and more particularly to an O-ring seal having improved means for utilizing the pressure within the valve to lock the O-ring in its groove during movement of the valve between open and closed positions.

Resilient sealing rings of circular or rounded cross section known as O-rings are in widespread use in valves of various types. The rings are normally contained in an annular groove of substantially rectangular cross section, and the groove may be in the movable part of the valve or in the stationary part which cooperates with the movable part to effect the seal. The cross sectional shapes of the rings and their grooves may vary greatly according to requirements, but the relative dimensions of the O-rings and their grooves are such that the ring is compressed between the movable and stationary parts to make an effective seal.

In valves handling relatively high pressures, O-rings give rise to special problems because, as the valve port which connects the inflow and outflow passages passes over the O-ring during opening or closing, the pressure acts on the ring in such a way as to tend to displace or blow it out of its groove. It has been attempted to mechanically hold the ring in place by providing lips on the groove overhanging or partly surrounding the ring, but such constructions have had limited success because under high pressures the ring is distorted sufficiently to squeeze out of its groove between the lips.

Certain prior constructions have provided vents leading from the bottom of the O-ring groove to the downstream side of the valve for the purpose of relieving the pressure under the O-ring, but when there is back pressure in the downstream side the pressure differential may be insufficient to hold the ring in its groove. Other prior constructions have provided a vent leading from the bottom of the O-ring groove to the valve cavity between the upstream and downstream passages, but the pressure in said cavity often approaches the pressure on the upstream side, in which case the pressure differential is again insufficient to hold the O-ring in its groove.

Moreover, certain of such prior constructions are normally designed to control the flow in one direction, and are not satisfactory if the flow is reversed so that the high pressure side of the valve becomes the low pressure side.

It is an object of the present invention to provide an improved vented, resilient, ring sealing construction for valves operating at high pressures which will prevent displacement of the ring from its groove under all conditions of opening and closing the valve with the flow in either direction.

Another object is to provide an improved, resilient, ring sealing construction for valves which will withstand relatively high fluid pressures without leakage.

A further object is to provide an improved, resilient, ring construction which is simple and economical in construction and assembly, and easily adapted to various types of valves.

These and other objects which will appear from the following description are accomplished by the improvements comprising the present invention, a preferred embodiment of which is shown in the accompanying drawing and described in detail herein. Various modifications and changes in construction are comprehended within the scope of the invention as defined in the appended claims.

In the drawings:

Fig. 1 is a vertical sectional view along the flow axis of a ball valve embodying the improved sealing construction, with the valve in full open position.

Fig. 2 is a fragmentary horizontal sectional view on line 2—2 of Fig. 1, showing the valve in partly open position.

Fig. 3 is an end elevation, partly in section, of the valve in the position of Fig. 1, taken along line 3—3 of Fig. 1.

While the improved sealing construction is shown and applied to a ball valve, it will be understood that it may be applied to other types of valves, including gate valves, handling fluids under high pressures.

The body of the valve comprises aligned, two-flow tubes A and B having annular flanges 3 at their inner ends, and the flanges are preferably bolted to opposite ends of a central cylinder 2 by circumferential series of bolts 9. O-rings 15 are provided between the abutting surfaces of the flanges 3 and cylinder 2, radially inward of the bolts 9, to make a fluid tight-joint.

At one point on its periphery, the cylinder 2 is provided with a radial bore journaling the stem 4 on an axis perpendicular to and intersecting the flow axis of tubes A and B at the center of the valve. The ball 1 is rotatably mounted with its center at the center of the valve, and is keyed to the inner end of the stem 4 for rotation on the axis of the stem. An O-ring 14 provides a seal around the valve stem. The inner end of the stem 4 is preferably provided with an annular flange 4' which seats against a bearing washer 18 recessed in the body cylinder 2, and a key 10 extends inwardly from said flange into the keyward 1' of the ball.

A valve stem tube 5 may be welded to the body cylinder 2 and has an annular lubricant groove surrounding the valve stem in which opposed V-ring packings 12 are located. Lubricant connections 11 may be screwed into the tube 5 and communicate with the annular space between the V-rings 12 for supplying lubricant to the valve stem. An annular wiper ring 13 may be held in the outer surface of tube 5 around the valve stem. An annular mounting flange 6 may be welded on the outer end of tube 5 for supporting a hydraulic motor which rotates the stem 4.

The improved sealing construction preferably includes a pair of O-rings 17, contacting each end of the ball in planes at right angles to the flow axis. The O-rings 17 preferably have cross sectional diameters substantially larger than the O-rings 14 and 15, and the sealing constructions at opposite ends are identical so that only one need be described in detail.

Each flow tube A and B has an annular recess 23 at its inner end in which a bronze seating ring 7 is mounted, and the seating ring has a spherically curved end surface 24 for conforming to the surface of the ball. A wavy or corrugated, resilient washer 19 is interposed between the bottom of the recess and the seating ring to yieldingly press the ring against the ball. The radially outer portion of the seating ring 7 has a reentrant annular shoulder 25 formed therein, abutting the O-ring 17. The radially inner periphery of the ring 7 is aligned with and conforms to the through port 26 of the ball in open position, as shown in Fig 1.

A retainer ring 27, L-shaped in cross section, is seated in the radially outer portion of the recess 23, and cooperates with shoulder 25 to form an annular groove of substantially rectangular cross section for containing O-ring 17 under compression. The retainer ring 27 may be screwed or otherwise secured in the recess 23. The annular end surface of the base of the L is spherically curved to conform to the ball surface and the seating ring 7 and retainer ring 27 form a seating ring assembly, and constitute surface elements of the body conforming to the ball surface. The end of the base is spaced from the radially outer end 28 of surface 24 of the seating ring a distance substantially less than the diameter of the ring, so that the two ends in effect provide lips partly overlying the O-ring to mechanically hold it in place.

At the corner of the rectangular O-ring groove, diagonally opposite the exposed portion of the ball, the top of the retainer ring 27 is provided with one or more vents 30, connected by an annular groove 30' to a passageway 20 in flow tube B communicating with the atmosphere. An O-ring 16 provides a seal between the retainer ring 27 and the flow tube B on one side of the vent 20, and an O-ring 16' provides a seal between the seating ring 7 and the flow tube B on the other side of the vent. The radially inner corner of the rectangular groove for O-ring 17 is connected by a vent 22 to the bottom of recess 23 occupied by resilient member 19, and the opposite or outer corner is connected by a vent 21 to the chamber or cavity between the exterior of the ball 1 and the cylindrical valve body 2.

In the operation of the valve, assuming the valve is fully open as in Fig. 1, and the flow is in the direction of the arrow in flow tube B, the upstream pressure enters the recess 23 in the space occupied by resilient member 19, and also enters between the ball 1 and seating ring 7 to the line contact of O-ring 17. Since the pressurized area behind the ring 7 is substantially greater than the pressurized area on the front surface of the ring, the differential pressure forces the O-ring tightly against the ball. Fluid pressure entering through vent 22 to the radially inner corner of the groove containing O-ring 17 also urges the ring 17 against the ball, the diagonally opposite corner being connected by vent 21 to the normally somewhat lower cavity pressure between the ball 1 and the valve body 2, and the corner diagonally opposite to the ball-contacting part of ring 17 being connected to atmosphere by the vent 20.

As the ball is rotated toward closing to the position of Fig. 2, the edge of ball port 26 passes over the O-ring 17, and if the groove containing O-ring 17 were not vented to atmosphere, the rolling contact between the ring and the ball, and the pressure fluid trapped in the corner diagonally opposite the ball-contacting part of ring 17, would tend to cause the ring 17 to follow the ball and displace the ring out of its groove into the ball port 26.

This tendency is overcome by venting the corner diagonally opposite the exposed or ball-contacting portion of the O-ring to atmosphere through passageway 20, so that the inlet pressure on the exposed portion of the ring urges it into its groove. The vent 21 tends to aid the inlet pressure in urging the ring into its groove, because until the edge of valve port 26 has passed the ring, the pressure in the cavity between the ball 1 and housing 2 may be substantially less than the inlet pressure on the exposed portion of the ring.

In the position of Fig. 2, if the flow through the valve is in the reverse direction, the vent 22 is connected with the downstream pressure in flow tube B, so that pressure is relieved in the radially inner corner of the O-ring groove. Pressure in the diagonally opposite corner flowing through vent 21 from the valve cavity is counteracted by pressure flowing to the exposed portion of the ring 17 between the ball and the base of retainer ring 27. Passageway 20 vents the corner diagonally opposite the exposed portion of the ball. Thus, the O-rings 17 on both upstream and downstream ends of the ball are pressure locked in their grooves during opening and closing of the ball valve. When the ball is completely closed, the pressure on the upstream side of the ball forces the ball bodily against the O-ring seal at the opposite or downstream side of the ball.

The improved construction is simple and inexpensive in construction and assembly, and is adapted to be used in a variety of types of valves to provide fluid-tight seals under high pressures. The cross sectional shape of the ring 17 and its groove may obviously be varied substantially while still permitting venting the groove at the side opposite to the exposed portion of the ring where the sealing action takes place.

What is claimed is:

1. In a valve having an inlet and an outlet duct connected to a body forming a valve chamber and a valve element movably mounted in said chamber between said ducts, a seating assembly in said body closely conforming to the surface of the valve element, said seating assembly having an annular groove of substantially rectangular cross section, an O-ring sealing member in said groove and having an exposed circumferential portion less than one diameter thereof in width, said O-ring being dimensioned to be mechanically deformed by the walls of said groove to urge said exposed portion into sealing contact with said surface portion of said valve element, said body having a vent to atmosphere connected to one corner of the annular groove opposite to the exposed portion of said O-ring sealing member, and said body having a vent communicating with the outlet duct connected to another corner of said groove opposite to the exposed portion of said O-ring sealing member, said vents acting to relieve the pressure on said ring and pressure lock said ring in said groove.

2. In a valve having an inlet and an outlet duct connected to a body forming a valve chamber and a valve element movably mounted in said chamber between said ducts, a sealing assembly in said body closely conforming to the surface of the valve element, said seating assembly having an annular groove of substantially rectangular cross section, an O-ring sealing member in said groove and having an exposed circumferential portion less than one diameter thereof in width at one corner of said groove, said O-ring being dimensioned to be mechanically deformed by the walls of said groove to urge said exposed portion into sealing contact with said surface portion of said valve element, and said body having a vent to atmosphere connected to said annular groove at the corner thereof diagonally opposite to the exposed portion of said O-ring sealing member and acting to pressure lock said ring in said groove, the other corners of said groove being vented one to the outlet duct and one to the valve chamber around said valve element.

3. In a valve having an inlet and an outlet duct connected to a body forming a valve chamber and a valve element movably mounted in said chamber between said ducts, said body having an annular recess around one of said ducts, a seating ring assembly movably mounted in said recess, said seating ring assembly and valve element having surface portions conforming to each other, a resilient member behind said seating ring assembly urging it against said valve element, an annular groove of substantially rectangular cross section in said seating ring assembly, an O-ring sealing member in said groove and having an exposed portion less than one diameter thereof at one corner of the groove contacting said valve element, said O-ring being dimensioned to be mechanically deformed by the walls of said groove to urge said exposed portion into sealing contact with said valve element, and said body having a vent to atmosphere connected to said annular groove at the corner diagonally opposite to the exposed portion of said O-ring sealing member.

4. In a valve having an inlet and an outlet duct connected to a body forming a valve chamber and a valve element movably mounted in said chamber between said ducts, said body having an annular recess around one of said ducts, a seating ring assembly movably mounted in said recess, said seating ring assembly and valve element having surface portions conforming to each other, a resilient member behind said seating ring assembly urging it against said valve element, an annular groove of substantially rectangular cross section in said seating ring assembly, an O-ring sealing member in said groove and having an exposed portion less than one diameter thereof contacting said valve element, said O-ring being dimensioned to be mechanically deformed by the walls of said groove to urge said exposed portion into sealing contact with said valve element, said body having a vent to atmosphere connected to one corner of the annular groove opposite to the exposed portion of the sealing ring, and said body having another vent to said one duct connected to another corner of said groove opposite to said exposed portion.

5. In a valve having an inlet and an outlet duct connected to a body forming a valve chamber and a valve element movably mounted in said chamber between said ducts, said body having an annular recess around one of said ducts, a seating ring assembly movably mounted in said recess, said seating ring assembly and valve element having surface portions conforming to each other, a resilient member behind said seating ring assembly urging it against said valve element, an annular groove of substantially rectangular cross section in said seating ring assembly, an O-ring sealing member in said groove and having an exposed portion less than one diameter thereof contacting said valve element, said O-ring being dimensioned to be mechanically deformed by the walls of said groove to urge said exposed portion into sealing contact with said valve element, said body having a vent to atmosphere connected to one corner of the annular groove opposite to the exposed portion of the sealing ring, and said body having another vent to said one duct connected to another corner of said groove oppsite to said exposed portion, the other corner of said groove being vented to the valve chamber around said valve element.

6. In a ball valve having an inlet and an outlet duct connected to a body forming a valve chamber and a ball having a flow passage therethrough rotatably mounted in said chamber between said ducts to control the flow therethrough, said body having an annular recess around the inner end of one of the ducts, a seating ring having an annular reentrant groove movably mounted in said recess, a retaining ring located in said reentrant groove and forming therewith an annular O-ring groove of substantially rectangular cross section, said seating ring and retaining ring having surface portions conforming to the surface of said ball, an O-ring sealing member in said O-ring groove and having an exposed portion less than one diameter thereof contacting said ball surface, said O-ring being dimensioned to be mechanically deformed by the walls of said O-ring groove to urge said exposed portion into sealing contact with said ball surface, and said body having a vent to atmosphere connected to said O-ring groove opposite to the exposed portion of said O-ring sealing member.

7. In a ball valve having an inlet and an outlet duct connected to a body forming a valve chamber and a ball having a flow passage therethrough rotatably mounted in said chamber between said ducts to control the flow therethrough, said body having an annular recess around the inner end of one of the ducts, a seating ring having an annular reentrant groove movably mounted in said recess, a retaining ring located in said reentrant groove and forming therewith an annular O-ring groove of substantially rectangular cross section, said seating ring and retaining ring having surface portions conforming to the surface of said ball, an O-ring sealing member in said O-ring groove and having an exposed portion less than one diameter thereof at one corner of said O-ring groove contacting said ball surface, said O-ring being dimensioned to be mechanically deformed by the walls of said O-ring groove to urge said exposed portion into sealing contact with said ball surface, and said body having a vent to atmosphere connected to said O-ring groove at the corner diagonally opposite to the exposed portion of said O-ring sealing member.

8. In a ball valve having an inlet and an outlet duct connected to a body forming a valve chamber and a ball having a flow passage therethrough rotatably mounted in said chamber between said ducts to control the flow therethrough, said body having an annular recess around the inner end of one of the ducts, a seating ring having an annular reentrant groove movably mounted in said recess, a retaining ring located in said reentrant groove and forming therewith an annular O-ring groove of substantially rectangular cross section, said seating ring and retaining ring having surface portions conforming to the surface of said ball, an O-ring sealing member in said O-ring groove and having an exposed portion less than one diameter thereof contacting said ball surface, said O-ring being dimensioned to be mechanically deformed by the walls of said O-ring groove to urge said exposed portion into sealing contact with said ball surface, said body having a vent to atmosphere connected to one corner of the O-ring groove opposite to the exposed portion of said O-ring, and said body having another vent to said one duct connected to another corner of said O-ring groove opposite to said exposed portion.

9. In a ball valve having an inlet and an outlet duct connected to a body forming a valve chamber and a ball having a flow passage therethrough rotatably mounted in said chamber between said ducts to control the flow therethrough, said body having an annular recess around the inner end of one of the ducts, a seating ring having an annular reentrant groove movably mounted in said recess, a retaining ring located in said reentrant groove and forming therewith an annular O-ring groove of substantially rectangular cross section, said seating ring and retaining ring having surface portions conforming to the surface of said ball, an O-ring sealing member in said O-ring groove and having an exposed portion less than one diameter thereof contacting said ball surface, said O-ring being dimensioned to be mechanically deformed by the walls of said O-ring groove to urge said exposed portion into sealing contact with said ball surface, said body having a vent to atmosphere connected to one corner of the O-ring groove opposite to the exposed portion of said O-ring, and said body having another vent to said one duct connected to another corner of said O-ring groove opposite to said exposed portion, the other corner of said O-ring groove being vented to the valve chamber around said ball.

References Cited in the file of this patent
UNITED STATES PATENTS

| | | |
|---|---|---|
| 2,628,809 | Mikeska | Feb. 17, 1953 |
| 2,722,402 | Crookston | Nov. 1, 1955 |
| 2,747,611 | Hewitt | May 29, 1956 |
| 2,810,542 | Bryant | Oct. 22, 1957 |
| 2,810,543 | Bryant | Oct. 22, 1957 |
| 2,847,182 | Moncusi | Aug. 12, 1958 |